United States Patent
Fusco (10) Patent No.: US 7,160,605 B2
(45) Date of Patent: Jan. 9, 2007

(54) DECORATED PANEL AND PROCESS FOR MAKING THE SAME

(76) Inventor: Luciano A. Fusco, Rua Coronel Diogo 710, Sao Paulo 01545-001 (BR)

( * ) Notice: Subject to any disclaimer, the term of this patent is extended or adjusted under 35 U.S.C. 154(b) by 389 days.

(21) Appl. No.: 10/795,485

(22) Filed: Mar. 8, 2004

(65) Prior Publication Data

US 2004/0219335 A1 Nov. 4, 2004

Related U.S. Application Data

(63) Continuation-in-part of application No. 10/345,749, filed on Jan. 16, 2003.

(30) Foreign Application Priority Data

Apr. 12, 2002 (BR) ................................. 0201285

(51) Int. Cl.
*D04M 1/00* (2006.01)
*G09F 19/00* (2006.01)
*B32B 27/08* (2006.01)

(52) U.S. Cl. .................. 428/292.1; 40/615; 428/40.1

(58) Field of Classification Search ............. 428/292.1, 428/40.1; 40/615
See application file for complete search history.

(56) References Cited

U.S. PATENT DOCUMENTS

| 4,682,433 | A * | 7/1987 | Stilling .................. 40/615 |
| 4,716,672 | A * | 1/1988 | Arakawa ................. 40/615 |
| 6,235,363 | B1 * | 5/2001 | Bilodeau ................ 428/40.1 |
| 6,571,497 | B1 * | 6/2003 | Aylward et al. .......... 40/615 |
| 6,627,022 | B1 * | 9/2003 | Fusco ................... 156/155 |
| 6,677,021 | B1 * | 1/2004 | Barnette et al. ........ 428/40.1 |
| 6,770,053 | B1 * | 8/2004 | Scarfone et al. ........ 604/117 |
| 6,780,486 | B1 * | 8/2004 | Kuo et al. ............. 428/40.1 |

* cited by examiner

*Primary Examiner*—N. Edwards
(74) *Attorney, Agent, or Firm*—Cantor Colburn LLP (57) ABSTRACT

A decorated panel and a process for manufacturing a decorated panel are disclosed. The decorated panel comprises a multi-layered system of linking, printing and finishing films laminated on opposite sides of a structural core formed of a fiber layer impregnated with synthetic resin. The multi-layered system of plastic films allows the creation of new optical effects which include reproduction of the same color tones under different lighting conditions, pre-arranged superimposition of complementary images, double-sided printing, a combination of translucency and opacity, as well as other graphic possibilities. These panels are used for visual communication, advertising, signs, architecture and other applications.

15 Claims, 6 Drawing Sheets

DECORATED PANEL AND PROCESS FOR MAKING THE SAME

RELATED APPLICATIONS

This application is a continuation-in-part of application Ser. No. 10/345,749, filed on Jan. 16, 2003 and having a priority date of Apr. 12, 2002.

BACKGROUND OF THE INVENTION

The present invention relates to a decorated plastic panel and a method for its manufacture. The panel is composed of a multi-layered system of films and/or sheets laminated on one or both sides of a structural core. The panel may be used for visual communication, advertising, signs, architecture and other applications.

Published U.S. patent application Ser. No. 09/739,345 (publication number US20010055662) relates to a decorative plastic panel wherein a printed sheet is introduced between two fiberglass reinforced resin (FRP) layers, producing a bi-laminated panel, decorated on the front side only, and molded between two plastic films.

The aforementioned product, while having innovative characteristics at the time, proved to be difficult to manufacture, since it demanded the independent consolidation of the two layers of fiberglass reinforced resin (FRP) located on both faces of the printed sheet, the necessity of disintegrating the substratum aiming the union of the two opposed layers of FRP, one on each side of the sheet, so as to avoid any possibility of delamination, internal air bubbles and deformations of the panel thus made. The panel had to be laminated by pultrusion and profiling devices and needed to be cured through several UV curing stations, located both above and below the laminate due to the barrier effect of the internal sheet. Furthermore, the mandatory translucency of the front layer of the panel restricted the choice of the resin, not allowing the use of some resins with exceptional structural and curability performances, such as epoxy resins, because of the poor weathering properties of these resins.

Also, in the prior decorative panel, the substrate of the sheet was required to be white, because any other color would modify the printed image, due to the translucency caused by the impregnation with the resin. Therefore, it was impossible to print on both sides of the internal sheet, since light passing through the panel caused the superimposition of the opposed images printed on either side. Additionally, opaque printing ink could not be used without the color of the image being altered. These drawbacks precluded the ability to create a double-sided panel.

Regarding other types of translucent decorative panels from the point of view of quality, it is known by experts in the field that conventional one-side decorated panels made using adhesive material or silk-screening change their color tones depending on the lighting condition when illuminated by front light or back light. Furthermore, they are more vulnerable to scratches, impacts, graffiti and other forms of aggression. They may not be washable, especially by solvents, and are subject to a premature loss of brightness, splendor, optical impact, and resistance to weathering.

Similarly, from the point of view of industrial applicability, it is also known that the decoration of conventional panels made using adhesives or silk screening is typically done by hand and its production may therefore be inconsistent, slow, and expensive.

SUMMARY OF THE INVENTION

Embodiments of the present invention provide a panel of simple composition and improved appearance and quality, allow new visual effects, and expand, by its versatility, the range of uses with numerous options related to printing features, according to the needs of a given application or desired effects.

As mentioned, decorative panels based on fiber reinforced plastic are known in the art, but none of them exploit the resources of a multi-layered system of films or sheets, laminated on one or both sides of a structural fiber reinforced plastic core layer. The multi-layered system of printed films allows new optical effects, including reproduction of the same color tones under different lighting conditions, i.e., with front light or back light; pre-arranged superimposition of complementary images; double-sided printing; the combination of translucency and opacity; a greater choice of resins, printing inks, and other components; and more graphic possibilities which will be described below.

An embodiment of the invention provides a versatile decorated panel composed of a multi-layered system of plastic films which allows variations in its form and constructive sequence, aiming to fulfill a wide range of applications in the visual communication, advertising, signs, and architecture fields, while providing innovative optical effects.

An embodiment of the invention is a decorated panel comprising a structural core, which can be self-supporting depending on its thickness and/or its composition, composed of a fiber layer impregnated with synthetic resin, said core incorporating on one or both sides thereof a multi-layered system of translucent and pigmented plastic films, printed in a predetermined sequence and coupled together by lamination, intermixing the printings with translucent ink layers enabling the reproducibility of the same color tones under different lighting conditions. If desired, the core can be manufactured to be translucent.

For some applications of the panel, it might be desirable to replace one or more of the layers of plastic film with one or more layers of natural or synthetic fiber, natural or synthetic textile material, or paper made of natural or synthetic material. While these materials are not interchangeable with plastic film because they have different properties, the manufacturing steps involved in using layers of these alternative materials in the decorated panel of the invention is the same as that for a panel where all of the layers comprise plastic film. For this reason, throughout the rest of the specification, references to films should be considered to include thin layers or sheets of these other materials as well.

An embodiment of the invention is a decorated panel having a core as described above, wherein some films of the multi-layered system are printed with different but complementary images so that, when lighted, they can superimpose, thereby producing a single, cohesive image, of pre-arranged composition, resulting from the sum of all the printings.

An embodiment of the invention is a decorated panel having a core as described above, wherein the innermost film of the multi-layered system of films is pigmented or printed with opaque ink so as to obstruct, either totally or partially, the light passing through the images printed on the external films, according to a predetermined layout, allowing creation of a double-sided panel having images presented on each side.

An embodiment of the invention is a decorated panel having a core as described above, comprising a multilayered system of films acting as a light diffuser element, wherein the light transmittance of the set is pre-arranged.

An embodiment of the invention is a decorated panel having a core as described above, wherein whenever the printing inks used are not chemically compatible with the resin used for the impregnation of the fiber, said inks can be encapsulated between two plastic films of the multi-layered system so as to avoid direct contact between inks and resin.

An embodiment of the invention is a decorated panel having a core as described above, wherein whenever a film used is not chemically compatible with the resin used for the impregnation of the fiber, said film can be coupled with a film which is compatible with both the chemically incompatible film and the resin of the core, thereby enabling lamination of the chemically incompatible film to the resin of the core.

An embodiment of the invention is a decorated panel made by a continuous, industrial and automated process, uniquely combining and juxtaposing rotary and continuous printing technology with a reinforced plastic continuous lamination, the decorated plastic panel comprising a multi-layered system of films, made by the process comprising the steps of: impregnating a fiber layer, preferably structured by continuous strands, with a synthetic resin composition, thereby forming a, continuous structural fiber and resin core; feeding a multi-layered system of films through floating devices including rods which are properly jointed so as to provide for geometrical adjusting and tensioning, and assuring the film's flatness after its being unwound from the reels and subjected to lamination; laminating said multi-layered system of films, coupled by adhesive resin, on one or both sides of the continuous fiber and resin core; consolidating the laminate through a system of cylinders; curing the multi-layered laminate thus obtained; and collecting the multi-layered panel on a take-up reel.

Curing of the laminate can be done either by UV radiation or by heating. Thermal curing is cheaper, while radiation curing provides better quality to the panel, especially in regard to its flatness. The main difference is the cost of the photo-initiators required in the UV curing, which is much more expensive than the peroxide catalysts used in thermal curing.

It was determined that by mixing the normal quantity of thermal curing agents, usually peroxide catalysts, with a very small quantity of UV photo-initiators, the panel can be cured in two subsequent and continuous stages, achieving the advantages of both thermal curing and UV curing, i.e. low cost and high quality.

So, according to a further embodiment of the invention, the curing is done using mixed curing, by two subsequent stages: a first stage of UV curing where the laminate is partially hardened, sufficient to avoid any further deformation which would occur during the continuous process (10–15 Barcol degrees is sufficient if polyester resins are being used), followed by a second stage of thermal curing to complete the curing (up to 50 Barcol degrees, for polyester resins).

Decorated panels which are surprisingly and impressively bright can be produced by intermixing translucent white ink between the printing layers, adding glass micro-beads and metallic pigments to the laminating resins, and the controlled variation of the refraction indexes in the components, which produces unique characteristics which will be described below.

In one embodiment of the present invention, one printing film from the multi-layered system is printed with a first ink layer in any color, upon which is applied, sequentially, intermediate translucent white ink layers intercalated with backing ink layers having similar color to the first. When lighted with a front light the panel will show just the color of the first layer, whilst when back lighted the panel will show the combination or sum of colors of the first and the backing layers. Properly formulating the ink of the backing layers, especially its composition, resin, fillers, color, pigment concentration, and translucency, the panel will reproduce nuances of colors extremely similar under both lighting conditions.

This effect results from the combination of color nuances of the printing materials making them capable of reflecting artificial light on the same frequencies of light observed with natural light, respecting tolerance limits and pre-established metamerism conditions.

Repeating the procedure utilizing more backing layers of ink improves the quality of the resulting image of the system of multi-layered films.

The printing is preferably made on the side of the films facing the central core, i.e., in reverse printing, when the films are transparent, or in surface printing on the external side of the films when they are translucent or pigmented, further coupled with an external finishing film.

In another embodiment of the present invention, one or more films are printed forming a first image, which might be polychromatic, upon which is printed, sequentially, a translucent white ink layer covering said first image, and one or more printed films forming a second image, whose layout is complementary with the first, with colors that can be different from the first. Thus, when lighted with front light the panel will show the first image only, whilst when back-lighted it will show the combination of both images superimposed, according to a pre-determined layout. The same process can be repeated with three, four, or more complementary images, enhancing even more the optical perception of volume or a similar effect of depth on the resulting image, resulting from the sum of all the printings.

Similarly, by properly adjusting the translucency of the intermixing white ink layers, several complementary images can also be observed with front light with similar effects to those observed when back-lighted.

In another embodiment of the present invention, aimed at the production of double-sided panels used as partition walls or for similar purposes, on one or both sides of the structural core is provided at least one opaque film or a film printed with opaque ink, usually comprising metallic pigments or the like, so as to prevent the visual superimposition or overlapping of the two opposite printing through the panel.

Another embodiment of the invention allows the creation of panels where just some parts or spaces are translucent—a method likely to be used in visual communication—that consists in printing an opaque ink layer covering only a few parts of the panel image, according to a pre-determined layout, leaving translucent some other parts of the panel, for instance the logos. Therefore, when back-lighted, the panel will show only the translucent parts, whilst the opaque parts will be observed with day light or by the halo made by the translucent back-lighted parts.

Another possible embodiment of the invention gives some pre-established parts of the panel a superficial contrasting matte or rough finish, created when one or more films of the system is peeled off, after an intermediate curing step, leaving the printing ink layers directly exposed on the surface of those parts of the panel or, as an alternative, on the whole panel.

Yet, in another possible embodiment of the present invention, further demonstrating the versatility of the multilayered system panel offered in the invention, one or more printed films are located on one side of the core and nothing or a linking and finishing film can be used on the opposite side.

The printing inks used can often be chemically incompatible with the resins used for the impregnation of the fiber core. Thus, in another embodiment, the inks can be encapsulated between two plastic films so as to avoid direct contact between inks and resins.

Also, some convenient films materials, such as polypropylene, polyethylene or PVC, can be not chemically compatible with the resins used for the impregnation of the fiber in the core because they expand upon contact with some solvents, such as styrene. Thus, in a further embodiment, a chemically incompatible film is coupled with a film which is compatible with both the chemically incompatible film and the resin of the core, thereby enabling lamination of the chemically incompatible film to the resin of the core. Films or sheets made of some kind of natural paper, synthetic paper, textile material or natural or synthetic fiber can solve this problem as well.

Some printing methods subject the printing films to high temperatures, and such temperatures can adversely affect plastic films. Therefore, in another embodiment, printing films or sheets made of natural or synthetic paper, any suitable textile or fibrous material adapted for printing can be used.

Optionally, at least one plastic film printed with colored images or other decorations can be laminated on one side of the core and at least one pigmented or printed film can be laminated on the other side.

In another optional arrangement of the panel, especially in the case of back-light applications requiring thicker layers of printing inks going beyond the technical resources of the normally available printing equipment, more printing films can be added to the mentioned multi-layered system.

In another option, all films of the multi-layered system could be printed so as to obtain a stronger optical effect as desired. Additionally, a single polyvalent film capable of or allowing linking, printing and finishing, could replace some films of the multi-layered system.

The panel "P" produced according to the invention has a core wherein the fiber layer comprises a composition of glassfiber, natural and synthetic fiber, selected from the group consisting of chopped strand mat, fabric or woven roving, and veil, structured by continuous strands, so as to provide several finishing textures, the fiber layer being impregnated with synthetic resin. Moreover, it allows the simultaneous incorporation of the multi-layered system of decorated films on one or both sides of the core during the very formation of the core during the manufacturing process of any of the variations of the panel, avoiding the need for additional separate steps of siding the core.

The machinery disclosed, while being quite simple, allows an exceptional consolidation of the FRP core with a perfect structural composition of the laminate, making possible the continuous production of all kinds of high performance decorative panels, previously impossible to make, including a panel printed on both sides.

Obviously, the panel disclosed by the present invention, made of a single layer of fiber impregnated with resin, eliminates any possibility of delamination or separation of the composite material.

In composite materials such as the core of the present invention, which include in their formation resin and fiber, the resulting structural properties are more affected by the fiber/resin ratio than by any other cause or factor. Thus, high fiber content increases exponentially the mechanical resistance of the plastic laminate, as illustrated by the typical graph of FIG. 4.

High strength/weight ratios allow new market applications, otherwise impossible to achieve, for the formation of decorated panels, by using any one of the composition options proposed or even others not described, as long as they are based upon the present concept or basic idea.

Figure 4:
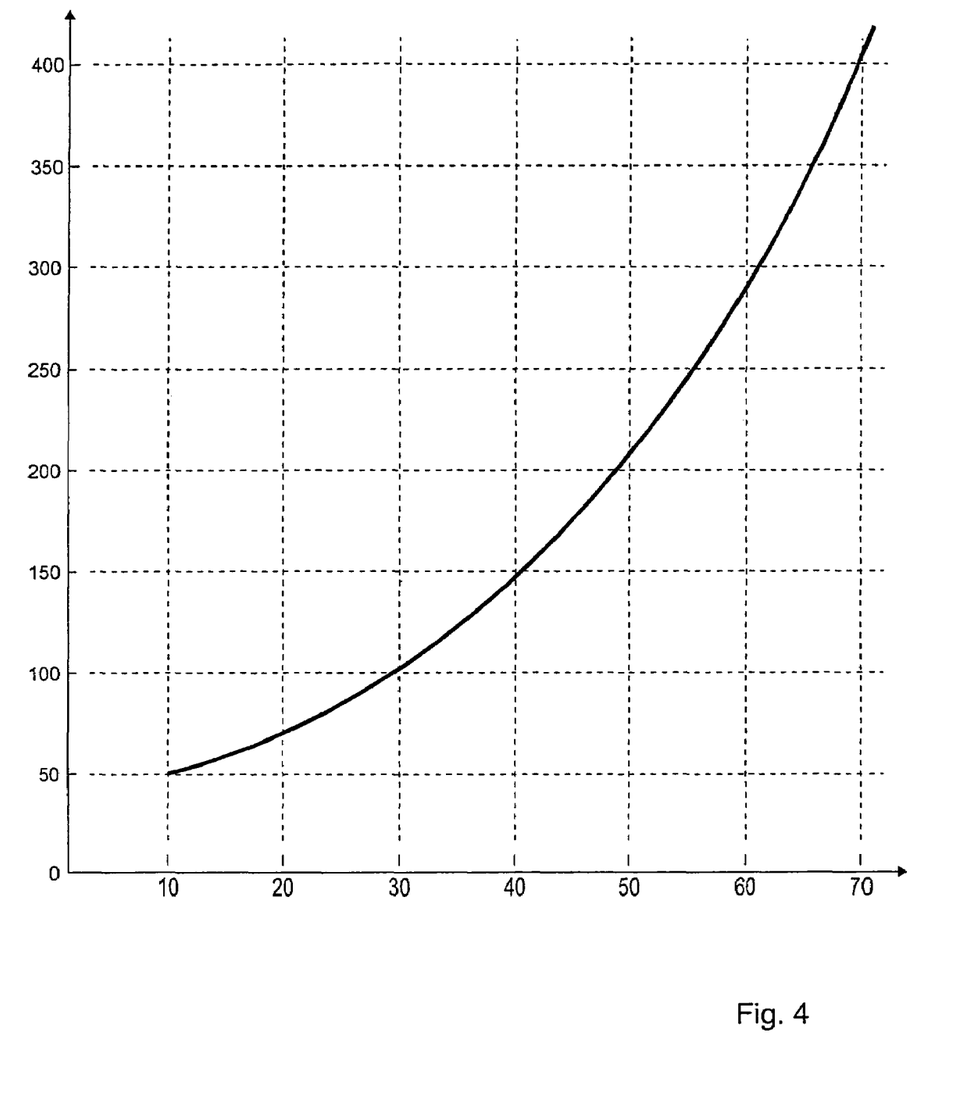
FIG. 4 shows a diagram illustrating the influence of the percentile fiber content on the tensile strength of fiber-reinforced plastics, with random orientation of the fiber, applicable to the structural core compositions of the panels according to an embodiment of the invention.

The use of fiber with oriented strands increases dramatically the fiber content in the compound, raising the fiber/resin ratio from figures that hardly overcome 20% to up to 70%, which allows the tensile strength to increase from about 650 kg/cm$^2$ to up to 4500 kg/cm$^2$, as indicated in the graph of FIG. 4, according to the reference: The Scott Bader Commonwealth Ltd. Polyester Handbook, Lund Humpries, London, 1969. In other words, the fiber content in the core structure of the panel can be adjusted to up to 70%, according to the requirements.

At the same time, minimization of the resin content in the structural core, diminish the possibility of deformation, yellowing, aging and cracking, whilst increasing the thermal and dimensional stability. The panel becomes thinner and lighter, more durable and economically convenient.

Furthermore, the resulting product, due to its thinness, lightness and flexibility, allows for packaging in reels of up to several hundred meters, simplifying its storage, handling and transportation.

BRIEF DESCRIPTION OF THE DRAWINGS

Advantages and features of the product according to the present invention will become more evident from the following detailed description of an embodiment of the invention, referring to the appended drawings, remarking the fact that they are not restrictive regarding other possible embodiments comprised by the invention, wherein.

DETAILED DESCRIPTION

Figure 1:
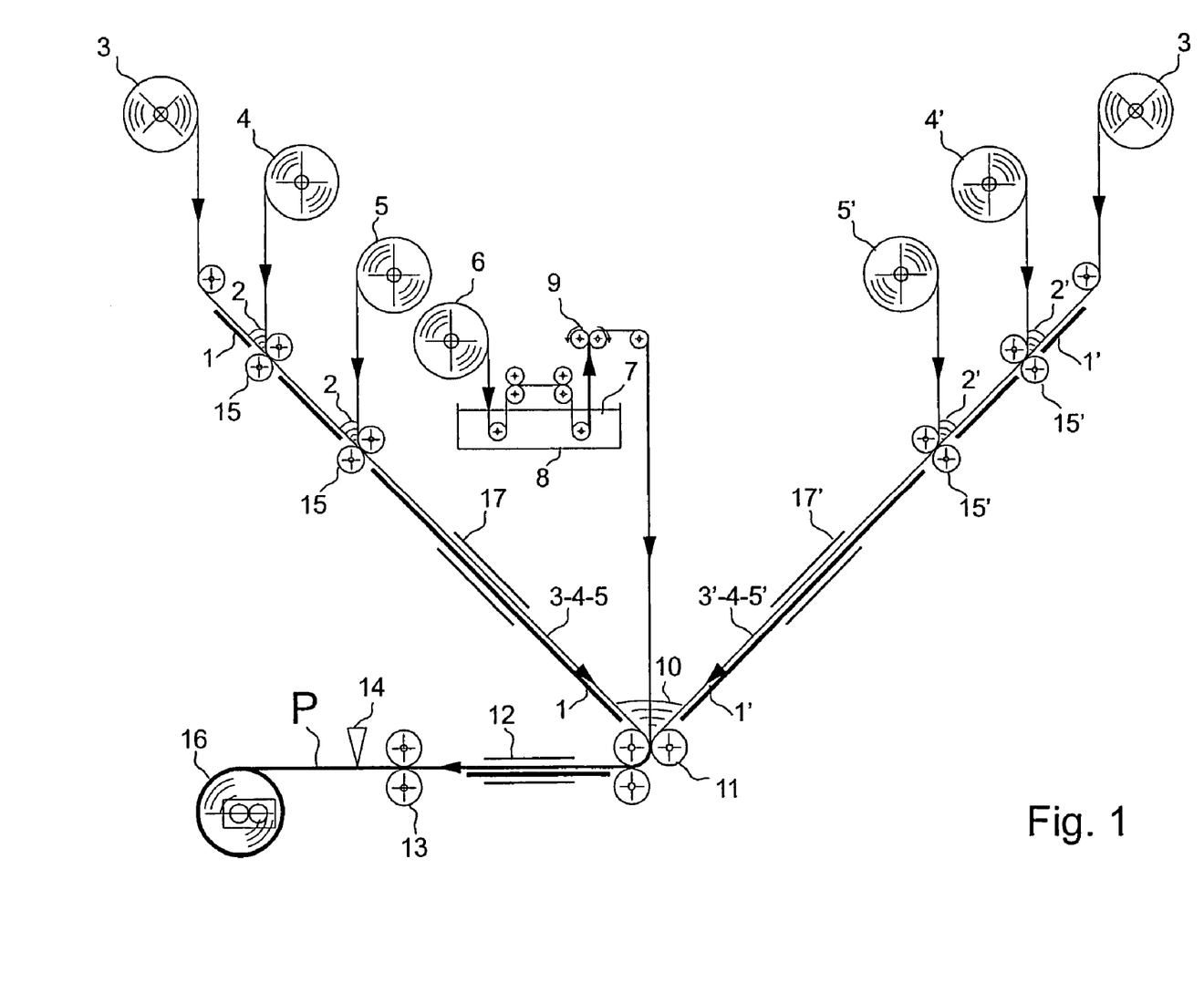
FIG. 1 shows the sequence of steps in the process of manufacturing the decorated panel as described in an embodiment of the invention.

In FIG. 1, fiber layer 6 is fed through vessel 8, which contains a curable resin 7 with which fiber layer 6 is to be impregnated. According to the present embodiment of the invention, said resin is a UV-curable resin. Of course, any other suitable curing method and curable resin may be used. Fiber layer 6 impregnated with resin 7 is passed through cylinders 9 to withdraw surplus resin, then fed through a second batch of resin 10, located at the apex of two converging platforms 1, 1' for the final adjustment of the resin/fiber ratio and to prevent the entrapment of air in the compound. Then the impregnated fiber layer is consolidated along with the multi-layered films systems 3, 4, 5 and 3', 4', 5' by means of a set of consolidation cylinders 11 and passed through curing station 12.

All the films are fed by carrier reels and unwound via tension control devices before being introduced onto platforms 1 and 1'. These platforms act as supports for the sliding passage of the films, during which passage they are coupled by synthetic adhesive resin 2 and 2' provided in rollers 15 and 15', and cured through stations 17 and 17'.

The final product "P" thus formed is hauled off by a pair of powered rollers 13, collected on reel 16, and cut, when needed, by cutter 14.

Figure 2:
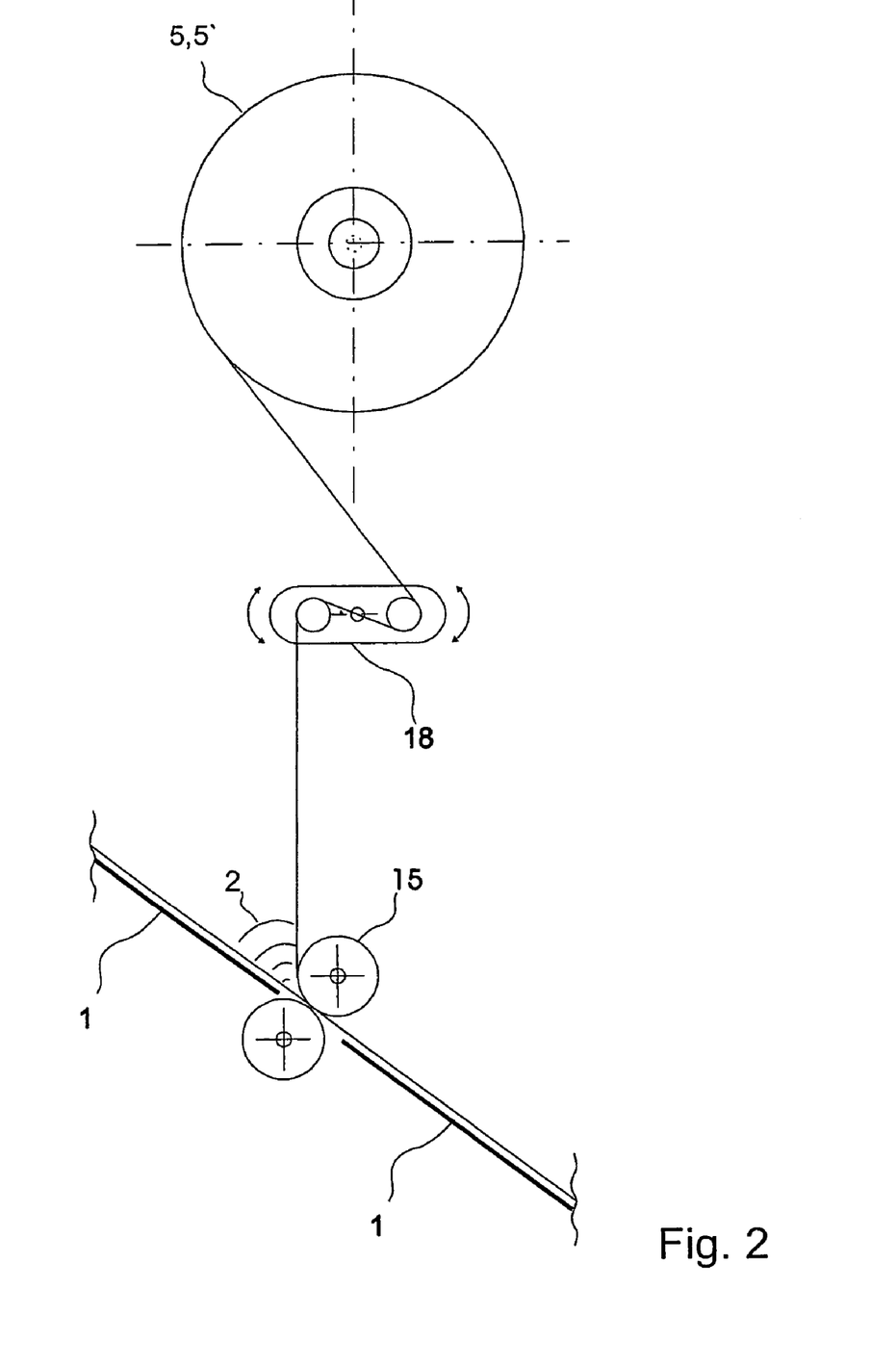
FIG. 2 shows a schematic view of a device for unwinding and feeding the films which are part of the multi-layered system of an embodiment of the invention.

FIG. 2 shows the feeding of the films through a floating device which forms a braking labyrinth 18 comprising a pair of rods 18, which are properly joined so that they automatically correct the possible geometrical variation in the carrier reels and, at the same time, control and adjust the tensioning of the films, thereby eliminating possible stretching and shrinking derived from its manufacturing by hot laminating and assuring the flatness of the panel surface.

Figure 3:
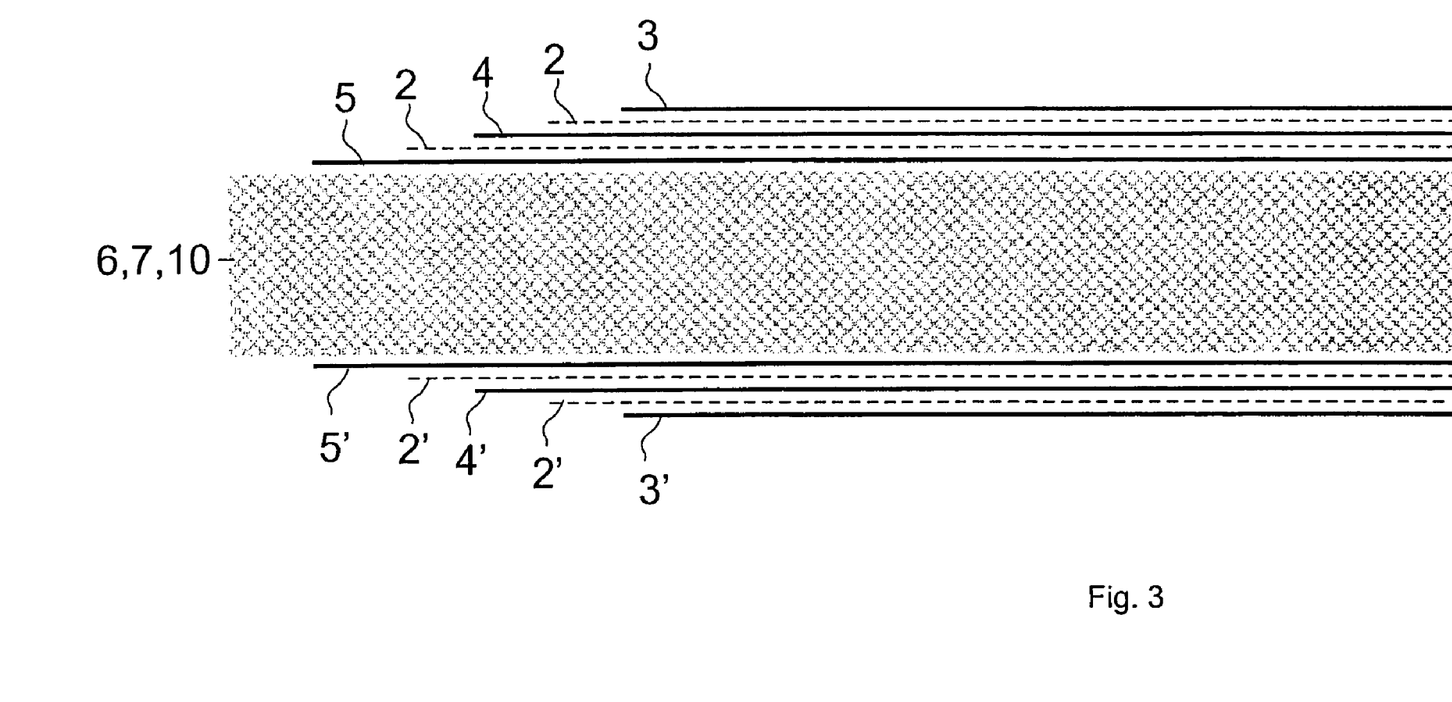
FIG. 3 shows a partial cross-section through a panel illustrating a typical multi-layered structure of films laminated on both sides of a structural core, according to the method of FIGS. 1 and 2.

FIG. 3 represents in cross sectional view an embodiment of the formation of the multi-layered panel "P", obtained according to the method illustrated in FIGS. 1 and 2, wherein the multi-layered groups of films 3, 4, 5 and 3', 4', 5' are joined to respective sides of the structural core 6, 7, 10.

The multi-layered system of plastic films, coupled by adhesive resin, is typically composed of three kind of films: linking films which have a face that bonds with the resin utilized for the impregnation of the fiber core, becoming permanently incorporated to it by cross-linking chemical combination and/or lamination; printing films coated with layers of reflective material and/or decorated by printing methods, preferably rotary printing; and finishing and protective films having structural features, such as embedded fiber, and/or sufficient thickness for forming a superficial kind of shield or armor against scratches and other perforating and impact efforts, its thickness depending on the use of the panel.

When the panel needs a superior protection against cuts and impacts, at least one external film from the multilayer system can comprise plastic resins reinforced with synthetic fiber, natural fiber, glass fiber, and their combinations.

The multilayer system of films can include films with properties of transparency, translucency, opaqueness, color, light reflectance including glass microbeads, resistance to weathering and radiation (e.g. UV), fiber reinforcement or any combination of these properties. The finishing of the external films can be glossy, textured, matte, and may be treated with slip agents, silicon, polytetrafluoroethylene (TEFLON), and the like.

Figure 5:
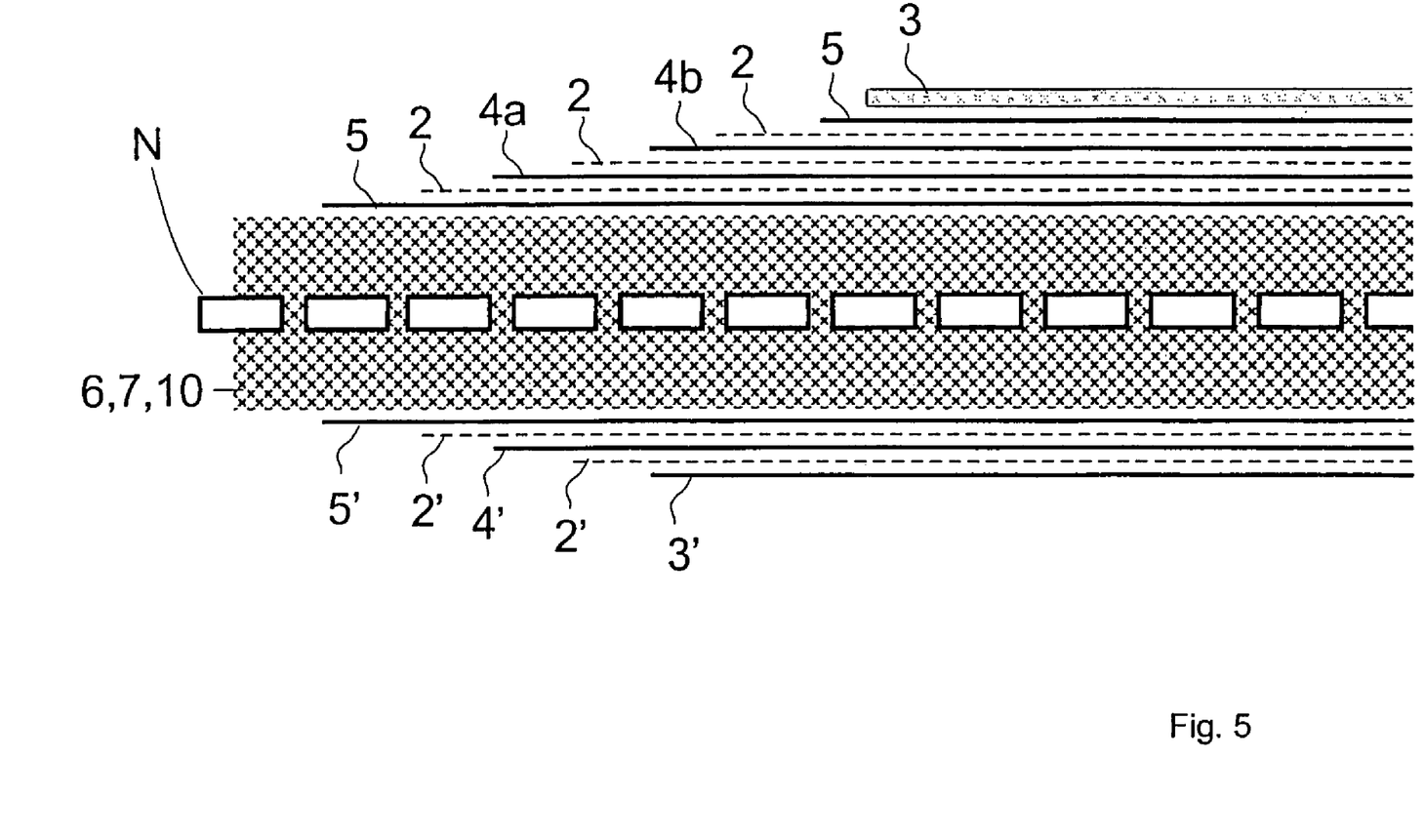
FIG. 5 shows a partial cross-section through a panel illustrating another embodiment of the invention.

FIG. 5 represents in cross sectional view an embodiment of the multilayer panel wherein, on one side of the core, the internal printing film 4a is a reflective film which is backing the external printing film 4b having decorations printed thereon, e.g. traffic signs, and the external film 3 is a thin fiber-reinforced plastic film, and on the opposite side, a typical structure of three films is composed. Also, nets, webs or layers "N" of natural, metallic or synthetic material, such as microsphere-filled, random laid, chopped fiber polyester fabric (COREMAT®), jute or the like, may be incorporated into the core so as to provide different characteristics of stiffness or plasticity to the panel.

Figure 6:
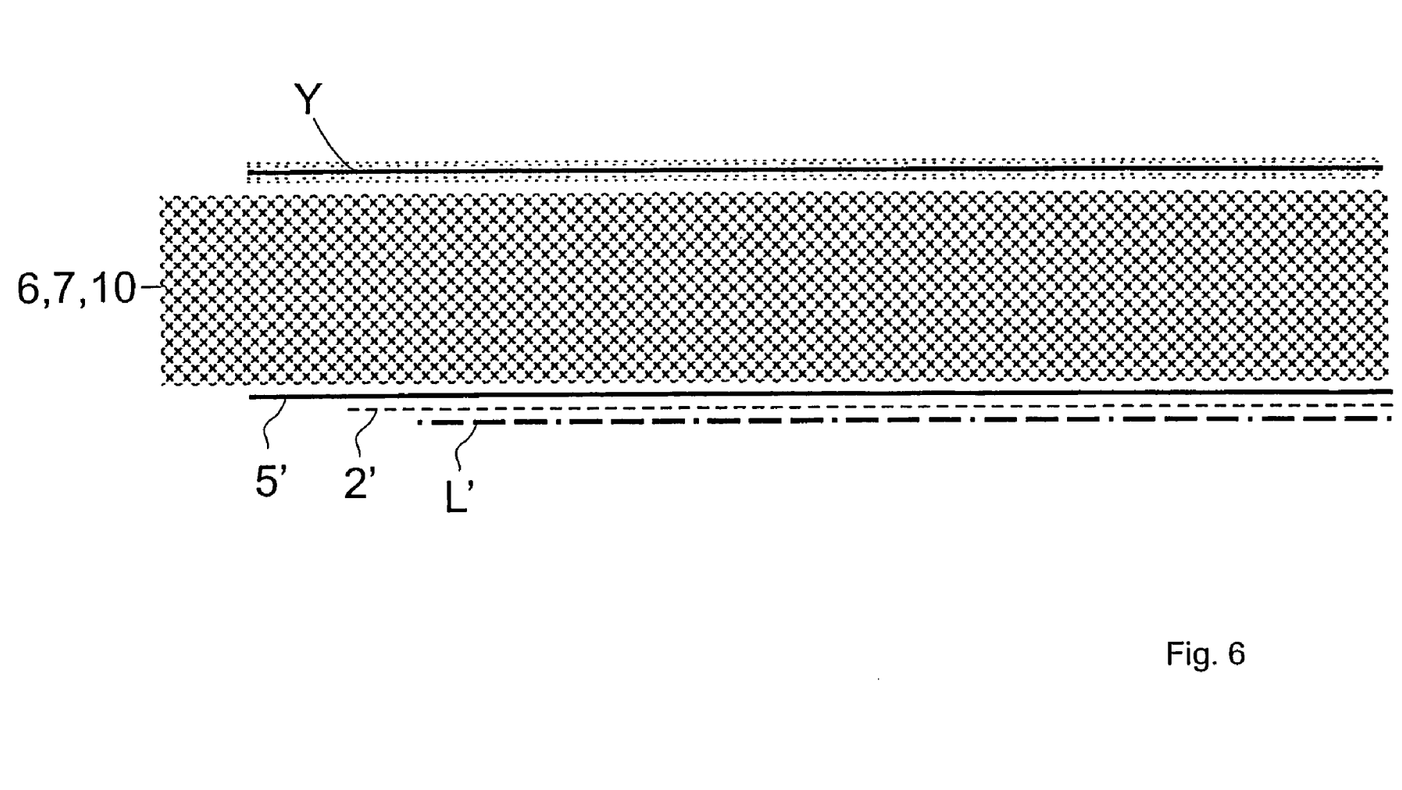
FIG. 6 shows a partial cross-section through a panel illustrating another embodiment of the invention.

FIG. 6 represents in cross sectional view another embodiment of the multilayer panel wherein, on one side of the core, a polyvalent film "Y" is located on one side and a linking film 5' coated with a layer of adhesive resin 2', such as PSA (Pressure Sensitive Adhesive) resin, having a release liner "L'", such as siliconed paper or the like, is located on the opposite side.

The polyvalent film "Y" replaces films of the multi-layered system since it is made by the process of spreading of linking, printing, and finishing layers of plastic resins on the side(s) of a plastic film to create, thereby, a single film which is then laminated onto at least one side of the core. These plastic resins are selected from a group consisting of resins capable of performing the linking, printing, and finishing functions and their combinations, such as linking-printing, linking-finishing, printing-finishing, linking-printing-finishing etc.

The PSA adhesive resin layer 2' incorporating the liner "L'", laminated on the external side of the linking film 5' allows the panel to be bonded onto any compatible surface upon removal of the release liner. Of course it would be obvious to one of ordinary skill in the art that the adhesive coated linking layer and release liner could be used on one side of a core having any combination of the other layers disclosed in the specification on the other side of the core. This is also true for the polyvalent, fiber reinforced finishing, and reflective layers.

The materials and properties of each film may vary depending on the use of the panel. The embodiment shown in FIG. 3 with three films on each side of the core of the panel is just typical and represents the main functions of a film. Some of the films may be omitted or may even be multiplied. This occurs independently on each side of the panel according with its use.

Other reasons influence the project or the selection of the films composing the multilayered system such as: the cost; the commercial availability; the incompatibility with a determined resin of the core; the achievement of shading colors, like fumé, rather difficult to obtain by printing; the protection to radiation, as UV; the sanitary or non-toxic properties; and other special requirements for particular types of panel according with its use and performance.

Not always are the three films on each side of the core. One kind of panel may have more than three whilst in another panel a single printed film may be enough. Conceptually, the panels proposed in the invention are derivations of a single family of panels.

The inclusion of a simple mechanical disposition to feed the plastic films eliminates serious problems with the panel flatness. Tensions and deformations in plastic films, typical of the hot lamination manufacturing, added to new tensions acquired during the printing and rewinding process, can create irregularities in the geometry of the reel body and stretching and shrinking in several parts of the film which are transferred to the panel, thus reproducing such irregularities in its surface. Said disposition comprises a floating device, illustrated in FIG. 2, which automatically corrects and adjusts the irregularities referred to.

As explained above, any suitable synthetic resin may be used in performing the process according to the invention. However, the UV-curable resins are preferred in performing the method according to the present invention. These resins include unsaturated, photosensitive resins, preferably polyester, vinyl, epoxy, melamine, phenol, acrylic and polyurethane resins, or combinations thereof and they can contain fillers and translucent or opaque pigments.

Below is appended a table, showing some properties of a multi-layered panel according to a method of one embodiment of the present invention.

While the invention has been described in detail above, it is not intended to be limited to the specific embodiments as described. It is evident that those skilled in the art may now make uses and modifications of and departures from the specific embodiments described herein without departing from the inventive concepts and basic idea of the present invention.

TABLE 1

Typical Properties of a laminate - 0, 7 mm

| Product characteristic | Value | Tolerance | Standards |
| --- | --- | --- | --- |
| Thickness [mm] | 0.7 | ±0.1 | Standard |
| Chopped strand mat [g/m$^2$] | — | | Supplier Information |
| Woven Roving [g/m$^2$] | 600 | | Supplier Information |
| Density [g/cm$^3$] | 1.55 | ±0.05 | Standard |
| Area weight [g/m$^2$] | 1085 | ±150 | Standard |
| Glass content [%] | 51.4 | ±1.5 | Standard |
| Tensile strength [N/mm$^2$] | 211 | ±10 | DIN 61/ISO 527 |
| Modulus of elasticity [N/mm$^2$] | 13100 | ±500 | DIN 61 |
| Elongation at break [%] | 1.75 | ±0.2 | DIN 61/ISO 527 |
| Hardness [° Barcol] | 50 | ±10 | DIN 59 |

What is claimed is:

1. A decorated panel comprising:
a free-standing structural core comprising a reinforcing fiber layer, that has been impregnated with a synthetic resin composition, and cured,
one or both sides of said core each having laminated thereto, incorporated by chemical cross linking, a multi-functional system of plastic resin layers, each system comprising at least one resin layer for linking, at least one resin layer for decorating, and at least one resin layer for finishing,
said at least one linking resin layer being bonded with or laminated to the synthetic resin composition of the core, bonded to the synthetic resin composition by cross-linking,
said at least one decorating resin layer including images, text, or other decorations printed or coated in any color, and
said at least one finishing resin layer having thickness sufficient to provide protection from scratches and being washable.

2. The decorated panel of claim 1, wherein said core is translucent.

3. The decorated panel of claim 1, wherein at least one of said at least one decorating resin layer comprises a multi-layer system of layers decorated with different but complementary images so that, when backlit, they can superimpose, thereby producing a single, cohesive image, of pro-arranged composition, resulting from the sum of all the complementary images on the respective layers of the multilayer system of the decorating resin layer.

4. The decorated panel of claim 3, wherein said multilayer system of layers of said at least one decorating resin layer comprises a reflective film or a layer coated with reflective ink.

5. The decorated panel of claim 1, wherein a net of natural, metallic or synthetic material is incorporated into the core so as to alter the characteristics of stiffness or plasticity of the panel.

6. The decorated panel according to claim 1, wherein said multi-functional system of plastic resin layers are each joined to each adjacent layers by chemical cross linking, wherein of polymer chains of adjacent layers are joined, thereby increasing the strength of the polymer network and obtaining a unique and single material with no distinction of layers in the finished panel.

7. The decorated panel according to claim 1, wherein said synthetic resin composition of said core contains photo-initiator curing agents and peroxide catalyst, said panel having perfect smoothness because said photo-initiator curing agents enable the panel to be partially hardened in a first, gradual stage by UVA radiation in the continuous line of production, thereby avoiding the typical deformations and cellulite caused by heat, and said panel reaching its complete hardening in a second stage when said peroxide catalyst reacts while the panel is stored in a flat position, at room temperature, off the production line.

8. The decorated panel according to claim 1, wherein said finishing resin layer is reinforced by fiber embedded therein.

9. The decorated panel according to claim 1, wherein said fiber layer of said core comprises continuous strands.

10. The decorated panel according to claim 1, wherein said fiber layer of said core comprises oriented strands.

11. The decorated panel according to claim 1, wherein said multi-functional system of plastic resin layers is bonded to only one side of said core, and the other side of said core has bonded thereto a linking film, the side of the linking film remote from the care being coated with a layer of adhesive resin and a release liner, thereby enabling the panel to be bonded onto any compatible surface.

12. The decorated panel according to claim 1, wherein said multi-functional system of plastic resin layers is bonded to both sides of said core.

13. The decorated panel according to claim 1, wherein at least one of said at least one decorating resin layer comprising several colored ink layers printed thereon, intercalated with franslucent ink layers.

14. The decorated panel according to claim 1, wherein the layers of said multi-functional system of plastic resin layers are coupled together by adhesive resin.

15. The decorated panel according to claim 1, wherein selected portions of the panel have a superficial matte finish or a superficial rough finish produced by removing selected portions of the finishing resin layer after an intermediate curing step, thereby leaving the printing of the decorating resin layer directly exposed.

* * * * *